United States Patent [19]

Akerberg et al.

[11] Patent Number: 4,834,773
[45] Date of Patent: May 30, 1989

[54] MITRE CUTTER DEVICE FOR CABLE DITCHES

[75] Inventors: Jan Akerberg, Stockholm; Bo Nilsson, Nacka, both of Sweden

[73] Assignee: SMC Stockholms Maskincentral Aktiebolag, Stockholm, Sweden

[21] Appl. No.: 117,326

[22] Filed: Nov. 6, 1987

[30] Foreign Application Priority Data

Nov. 25, 1986 [SE] Sweden ............................ 86/05027
Jan. 20, 1987 [SE] Sweden ............................ 87/00191

[51] Int. Cl.$^4$ ............................................ B23D 57/02
[52] U.S. Cl. ........................................ 30/382; 30/388; 83/468; 83/581
[58] Field of Search ................ 30/371, 382, 388, 375; 83/581, 455, 454, 468; 269/42

[56] References Cited

U.S. PATENT DOCUMENTS 3,991,643  11/1976  Girardin ....................... 83/581 X
4,300,426  11/1981  Weaver ......................... 30/375 X
4,693,158   9/1987  Price ............................ 83/698 X Primary Examiner—Eugene R. Laroche
Assistant Examiner—Seung Ham
Attorney, Agent, or Firm—Larson & Taylor

[57] ABSTRACT

A mitre cutter arrangement is provided for making mitred cuts in cable ditches. The arrangement comprise a mitre table with a base and a number of guide members extending from the base of the table in spaced relationship so as to accommodate standardized sizes of the cable ditches; clamps for clamping the cable ditch to the mitre table, and a mitre ruler provided with at least one flange extending along the side edge thereof and a groove extending in the longitudinal direction of the ruler. The groove receives a saw blade, and clamps are provided which secure the mitre ruler to the cable ditch. A saw device, guided by mitre ruler, carriers the saw blade as well as guide wheels running along the mitre ruler.

10 Claims, 3 Drawing Sheets

U.S. Patent    May 30, 1989    Sheet 1 of 3    4,834,773
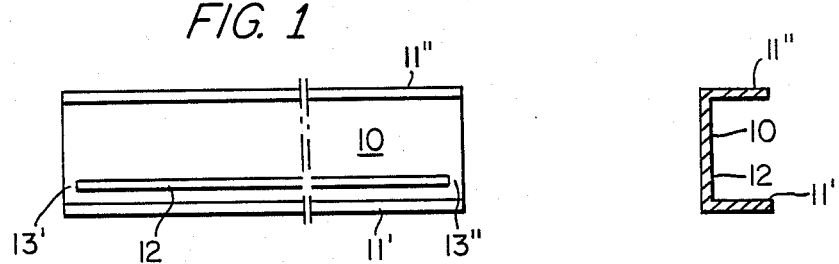
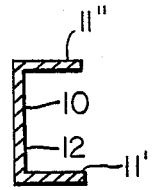
FIG. 1
FIG. 2
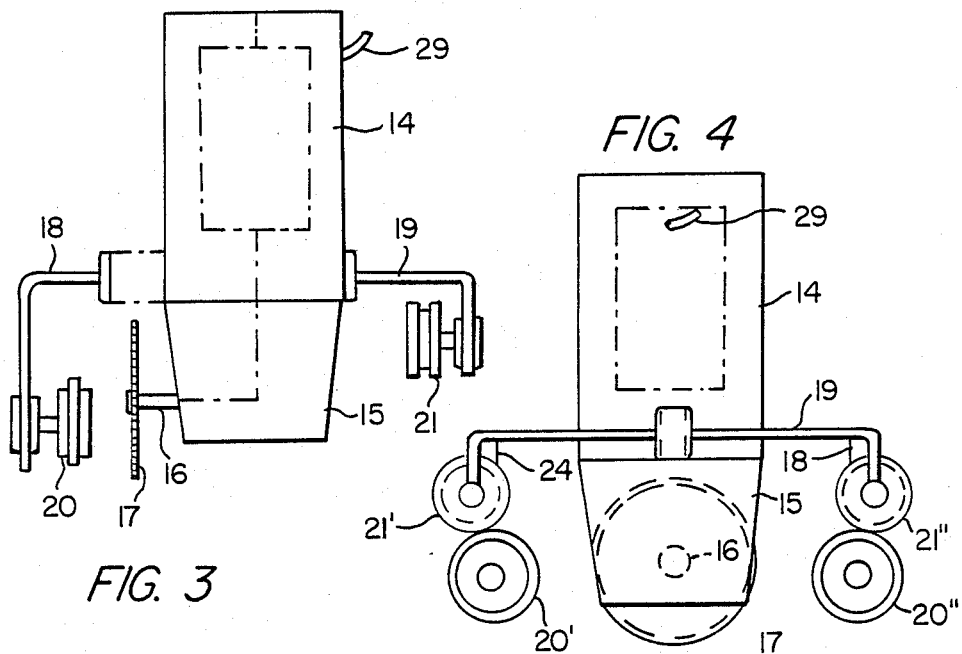
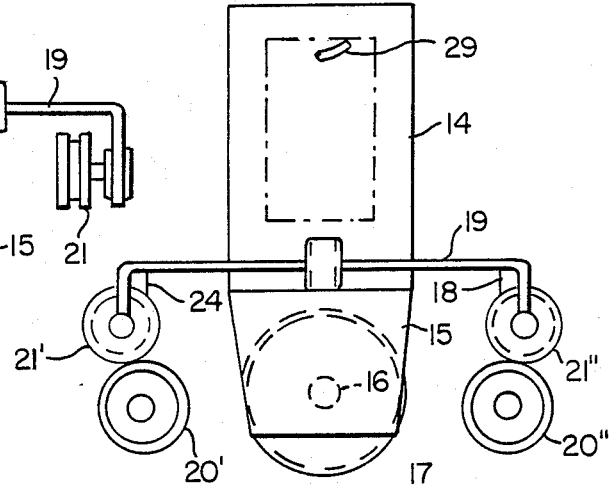
FIG. 3
FIG. 4

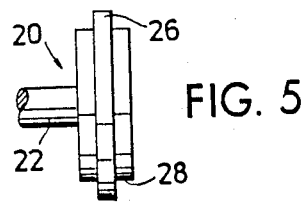
FIG. 5
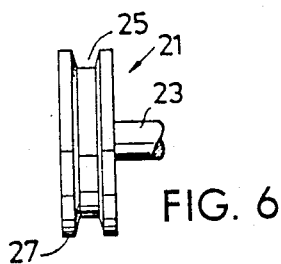
FIG. 6
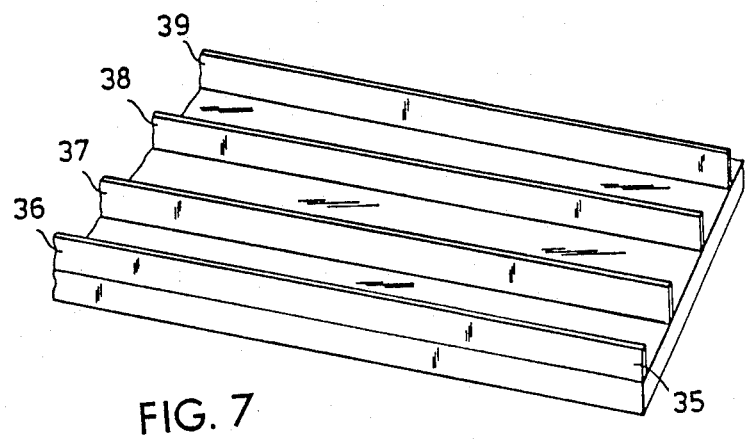
FIG. 7
FIG. 8
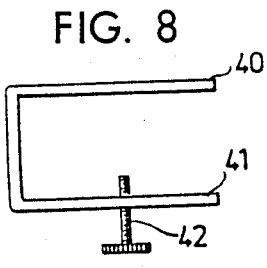
FIG. 9
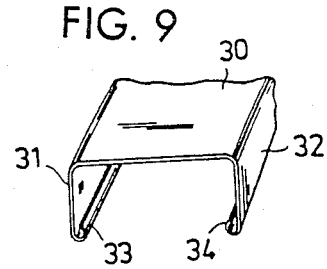

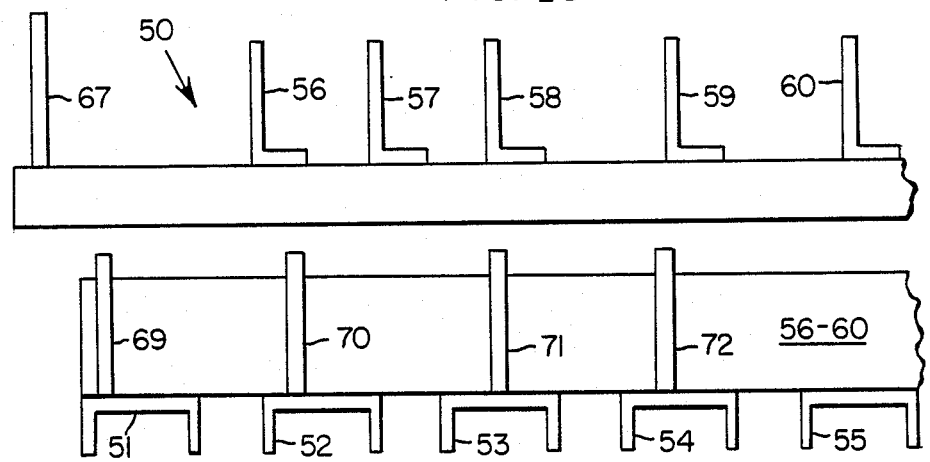
FIG. 10
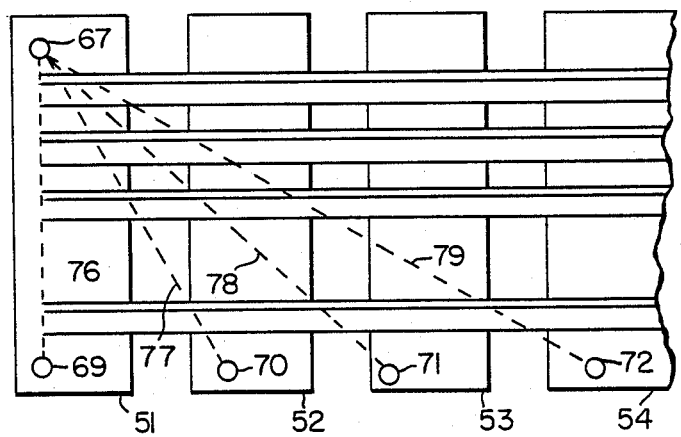
FIG. 11
FIG. 12
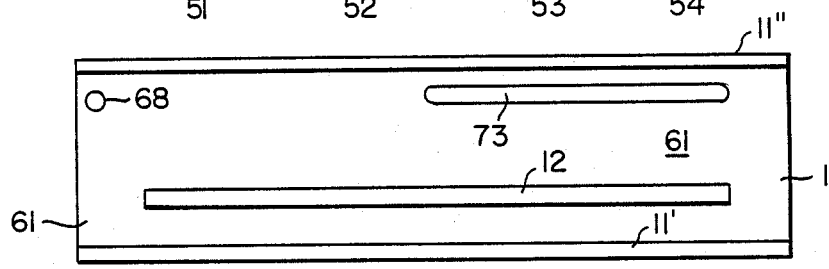
FIG. 13

MITRE CUTTER DEVICE FOR CABLE DITCHES

FIELD OF THE INVENTION

The present invention relates to mitre cutter devices for making mitred cuts in metal channel members.

BACKGROUND OF THE INVENTION

It often happens that in buildings, especially factory or store buildings but also in other localities, that the existing electric conduits are applied in elongated, three-sided channels made from metal, plastic or the like, These channels, also called cable ditches, are usually mounted with their open side turned upwards hanging on hooks at the ceilings of the buildings but it also happens that they are provided close to the walls or beneath shelves provided along the walls of the spacing. Sometimes, the cable ditches are covered by means of a lid forming material but rather often they are left open without such lid forming material.

Dependent upon the room planning, it is usually impossible to provide the cable ditches fully linearly straight but they have, practically in all cases, to be mounted in bends or angles, which means that one will have to cut the cable ditches in some mitre relation between their ends. It is of utmost importance that these mitre joints are tight and that the ends of the two cable ditch sections attach each other closely so that the joint is not visible or at least so that the joint will be as little visible as possible.

A mitre cut is easily provided in a satisfactory way when the material is wood, such as is the case in making a picture frame, but as the cable ditches are practically exclusively made from plastic or metal which cannot be sawed as nicely as wood, extremely good tools are required for the mitre cutting of these materials. As a rule, the mitre cutting has to be made at the building place, and the mitre cutter apparatus hiterto known, which could be used for mitre cutting of cable ditches, have been stationary and were so big and heavy that they were not suitable for transportation to and from the building place and, still less, for transportation within the building place.

SUMMARY OF THE INVENTION

The present invention regards a mitre cutter apparatus giving an exceedingly good mitre cut result without visible joints or with only scarcely visible joints, and which is, furthermore, adjustable for deliberate angles and is light and convenient so that it may be transported not only from a store to the building place but also from one place to another one within the building.

The mitre cutter apparatus according to the invention comprises the following parts, separable from each other but cooperating: a mitre cutter table with borders provided to adapt to different widths of the cable ditches, clamps or similar attachment means for attaching the cable ditch to the cable ditch mitre cutter table, a mitre cutter ruler to be placed over the cable ditch, to be adjusted into the correct angle and to be locked by means of clamps or similar means, and a mitre cutter saw which is preferably of the type that is driven by an electric motor and provided with a rotating saw blade.

The invention will be further described below in connection with the embodiments shown in the drawings, but it is understood that the invention shall not be limited to these embodiments but that all different types of modifications may exist within the frame work of the invention.

BRIEF DESCRIPTION OF THE DRAWINGS

In the drawings,

FIG. 1 shows the mitre ruler from above, only the ends of it being shown.

FIG. 2 is a cross section through the mitre ruler.

FIG. 3 shows the saw along with the saw driver motor and the gear box and the guide means belonging thereto.

FIG. 4 shows same arrangement perpendicularly to the longitudinal direction of the mitre ruler.

FIG. 5, in enlarged scale, shows a guide wheel engaging a grove in the mitre ruler, and FIG. 6 shows a similar guide wheel, cooperating with a flange of the mitre ruler.

FIG. 7 shows the mitre cutter table, and

FIG. 8 shows a clamp which may be used both for attachment of the working piece to the mitre ruler and for attachment of the working piece to the mitre cutter table.

FIG. 9 shows in perspective a short section of a cable ditch.

FIG. 10 is an end elevational view of a second embodiment of the mitre cutter table.

FIG. 11 is a side elevational view of the embodiment of FIG. 10.

FIG. 12 is a plan view of the embodiment of FIG. 10.

FIG. 13 is a plan view of a mitre ruler used with the embodiment of FIG. 10.

DESCRIPTION OF THE PREFERRED EMBODIMENTS

The cable ditch shown in FIG. 9 comprises three sides, one of which 30 being turned downwardly in the mounted state of the ditch and the two sides 31 and 32 being connected to the first mentioned one. At their free sides, the last mentioned ones, usually, are provided with a rolled hem 33 and 34, respectively. These rolled hems have for their purpose to make possible the hanging up or mounting of the cable ditch at a ceiling with the open side turned upwardly, thereby enclosing the cables. When providing a joint between the sections of the cable ditch, one section is placed at right angle over the other one end, by drawing or engraving, lines are marked on the angular places of each of the two cross sides 31 and 32 of each of the two cable ditches. Guided by these markings one may, thereafter, provide the corresponding angular marking on the upper side 30 which will, when the cable ditch is mounted in its final place, be its bottom side. Thereafter, the cable ditch is placed on the mitre cutter table, one cross side or longitudinal flange 31 being placed tight to, i.e., in engagement with the outer side 35 of one of the parallel borders 36–39 and so on of the mitre cutter table. These borders are adapted to standardized dimensions of the cable ditches, so that the outer cross side 32 or longitudinal flange of the cable ditch 30 will tightly engage the side of another one of the said borders 37, 38 and so on, located further away from, i.e., spaced a predetermined standardized distance from flange 36. Thereafter, the cable ditch is clamped to the mitre cutter table, for instance by means of a clamp of the type shown in FIG. 8, which is applied with one arm 40 over the side 30 of the cable ditch and the other arm 41 under the mitre cutter table, said clamp thereafter being tightened by means of the screw 42.

Hereafter, the mitre ruler, shown in FIGS. 1 and 2, is placed over the cable ditch clamped to the mitre cutter table. A pair of the mitre ruler comprises a bottom 10, and, along each of the longitudinal sides, perpendicularly outwardly extending flanges 11′ and 11″ as well as, close to one of said flanges 11′, and a groove 12, extending along the major part of the length of the ruler through its bottom 10, with a bridge 13 remaining at each end for stabilization of the construction of the ruler during the mitre cutting procedure. The ruler, thereafter, is placed in correct position over the cable ditch according to the engraving made and on the cable ditch referred to above is clamped by clamping means of suitable type, for instance clamps of same type as shown in FIG. 8. The system, thereafter, is prepared for making the mitre cut. This cutting takes place my means of a saw device, which is shown in FIGS. 3-6.

The saw device comprises a motor casing 14, see FIGS. 3 and 4, in connection with a gear box 15 of a type that the rotational movement of the vertical motor shaft will be transferred into a rotational movement of a horizontal shaft 16. This out put shaft 16 carries the saw blade 17.

Two guide wheel hangers or support brackets 18 and 19, respectively, are attached to to the motor casing 14 or the gear box 15. For clarification of the description, the guide wheel hanger 18 has been shown separated from its place of attachment. In this embodiment as illustrated in FIG. 3, the two wheels 20, carried by hanger 18 would, in the drawing figure, have been concealed by the saw blade 17, making the drawing difficult to understand.

The wheels 20 are intended to run in the groove 12 of the mitre ruler when the apparatus is used for a mitre cutting procedure. The wheel hanger 19 also carries or supports two guide wheels 21 running or riding on the flange 11″, when the apparatus is used, flange 11″ being shown in FIGS. 1 and 2.

One of the guide wheels 20 is shown in enlarged scale in FIG. 5. The shaft 22 of a said wheel 20 is rotatably mounted on a downwardly turned portion 24 of the wheel hanger 18, and shaft 22 carries the wheel 20, which has a profile including a central annular portion 26 of a shape, which is preferably rectangular, so that this annular portion 26 will have a width accurately adapted for free movement in the groove 12 at the same time as the major portions of the periphery of said wheel 20 on the opposite sides of central portion 26 ride or run on the edges of the ruler bottom 10 at each side of the groove 12. One of the wheels 20 is located in front of and will run before the saw blade and the other one is located behind and will run after said saw blade.

One of the guide wheels 21 is shown in section in FIG. 6. This guide wheel 21 is provided with a peripheral groove 25 in the otherwise smooth, cylindrical surface 27. The groove 25, as to its shape and dimension, is adapted to the upper edge of the flange 11″. The shaft of the guide wheel shown in FIG. 6 is indicated by 25. The hanger 18 as well as the hanger 19, each carry preferably two, but in any case at least, two such guide wheels.

When making a mitre cut, the saw apparatus illustrated in FIGS. 3-6 is placed over the mitre ruler such that the wheels 20 will run in the groove 12 and the wheels 21 will run on the flange 11″, the saw motor thereafter being started and the cut executed.

By this arrangement, comprising a number of parts separable from each other, the apparatus is easy transportable. The parts may easily be mounted together at the working place, and one will, by means of the system described get an exceedingly nice cut through the cable ditch with edges so smooth, that they are scarcely or not at all visible, once the ditch has been mounted in its place.

Referring to FIGS. 10 to 13, in this embodiment, a mitre table 50 is formed by a number of transverse channels or beams 51–55. Beams 51–55 support a plurality of borders or guides 56–60, which are preferably in the shape of angle beams with their flanges attached to the bases of the underlying beams 51–55.

The relative positioning of the mitre table 50 and the mitre ruler 1 of FIG. 13 takes place, in this embodiment, by means of bolts or pins which cooperate with corresponding holes or one or more channels. Thus, in the specific embodiment illustrated, a bolt 67 is attached to the channel beam 51, and a hole 68 is provided in the bottom 61 of the mitre ruler. Futher bolts or pins 69, 70, 71, 72 are attached to each of the channel beams 51, 52, 53 and 54, respectively. These bolts or pins 69, 70, 71 and 72 correspond to a groove 73 in the bottom of the mitre ruler 2. The groove 73 is shaped in such a way that the bolts 69–72 may be inserted thereon. In order that the mitre ruler shall assume a position perpendicular to the longitudinal direction of the mitre table when the bolt 67 is inserted into the hole 68, the bolt 69 should be inserted into the groove 73. This will give a mitre angle of 90°.

In a corresponding way, the bolts 70, 71 and 72, when introduced into the groove 73, provide mitre angles of 60°, 45° and 30°, as indicated by the dashed lines 75, 77, 78 and 79 in FIG. 12.

When mounting a cable ditch for the purpose of cutting it at a given mitre angle, the cable ditch is first placed over the mitre table shown in FIGS. 10-12, with its flange 31 engaging the edge of the border 56 at left in FIG. 10, and the other flange 32 of the cable ditch engaging the right side of any one of the borders 57, 58, 59 or 60, dependent upon the size of the cable ditch. Thereafter, the mitre ruler 2 is placed over the cable ditch, with the bolt 67 being inserted into the hole 68, a selected bolt of the bolts 69–72 being inserted into the groove 73. The system is then ready for a cutting operating using the saw device described above and shown in FIGS. 3 and 4.

We claim:

1. A mitre cutter assembly for cutting mitre joints in cable ditches, said assembly comprising a mitre ruler adapted to be clamped to the cable ditch and including guide means thereon and a groove therein, a cutter apparatus including further guide means for, in cooperation with the guide means of the mitre ruler, guiding the displacement of said apparatus along the mitre ruler, and a mitre table for supporting the cable ditch in a given position and thereby support the mitre ruler, when clamped to the cable ditch, in a given position, the mitre table, the mitre ruler and the cutting apparatus being made as separate parts which can be mutually connected together, and the cutter apparatus comprising a saw device including a rotational saw blade which, when said cutter apparatus is displaced along the mitre ruler as guided by said guide means, will extend into and be displaced along said groove in the mitre ruler and will saw through the cable ditch affixed in place under the mitre ruler in the operative position of the mitre ruler.

2. A mitre cutter device according to claim 1, wherein the mitre table is provided with a plurality of upwardly extending, parallel border members, the mutual distances between which being adapted to the standardized measures of the cable ditches, such that each cable ditch, when applied over the mitre table, will with one flange thereof tightly contact a first one of the boarder members and with the other flange thereof contact at least one further border member of the remaining board members.

3. A mitre cutter device according to claim 2, wherein the guide means of said mitre ruler comprise longitudinal guide means, and said cutter apparatus includes two pairs of wheels arranged to cooperate with said longitudinal guide means, at least two such longitudinal guide means being provided, and at least two of said guide wheels cooperating with one of said longitudinal guide means and at least two of said guide wheels cooperating with the other one of said longitudinal guide means, one guide wheel of each of the pairs of guide wheels being disposed in front of the cutter apparatus and the other wheel of each pair being diplaced behind the cutter apparatus run behind same.

4. A mitre cutter device according to claim 3, wherein one of the pairs of guide wheels is arranged to ride in the groove provided for the saw blade in a bottom portion of the mitre ruler and wherein the other pair of guide wheels is arranged to ride on the edge of a longitudinal upwardly directed flange of the mitre ruler.

5. A mitre cutter device according to claim 4, wherein said one pair of guide wheels which ride in the groove in the mitre ruler includes an annular portion having a radius greater than the radius the remainder of the guide wheel, and having a width substantially equal to the width of the groove in the bottom of the mitre ruler.

6. A mitre cutter device according to claim 4, wherein each guide wheel of said other pair of guide wheels which ride on the edge of the longitudinal upwardly directed flange of the mitre ruler includes an annular groove in the peripheral surface of the guide wheel, the width of said groove being substantially equal to the width of said flange.

7. A mitre cutter device according to claim 6, wherein said annular groove is trapezoidal in cross section.

8. A mitre cutter device according to claim 1, wherein the mitre ruler is arranged to be clamped to the remainder of the device by means of releasable clamping means.

9. A mitre cutter device according to claim 1, wherein cooperating bolts and holes are provided in the mitre table and the mitre ruler for enabling the mitre rule to assume a predetermined portion with respect to the mitre table, and thus with respect to a cable ditch clamped thereto, representative of a predetermined mitre angle.

10. A mitre cutter device according to claim 9, wherein at least two holes are interconnected to form a longitudinal groove.

* * * * *